US012609016B2

(12) United States Patent
Heyl

(10) Patent No.: US 12,609,016 B2
(45) Date of Patent: Apr. 21, 2026

(54) METHOD FOR ASCERTAINING A CONFIGURATION OF AN OUTPUT OF INFORMATION FOR A USER OF AN AR DEVICE, AND AR DEVICE

(71) Applicant: Robert Bosch GmbH, Stuttgart (DE)

(72) Inventor: Andreas Heyl, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/606,332

(22) Filed: Mar. 15, 2024

(65) Prior Publication Data

US 2024/0331521 A1     Oct. 3, 2024

(30) Foreign Application Priority Data

Mar. 28, 2023    (DE) ..................... 10 2023 202 840.9

(51) Int. Cl.
| | |
|---|---|
| *G06F 3/14* | (2006.01) |
| *G06T 11/00* | (2006.01) |
| *G06V 20/20* | (2022.01) |
| *G08B 21/02* | (2006.01) |

(52) U.S. Cl.
CPC .............. *G08B 21/02* (2013.01); *G06F 3/14* (2013.01); *G06T 11/00* (2013.01); *G06V 20/20* (2022.01)

(58) Field of Classification Search
CPC ........................................................ G06F 3/014

USPC ............................................................. 345/8
See application file for complete search history.

(56) References Cited

U.S. PATENT DOCUMENTS

| | | | | |
|---|---|---|---|---|
| 10,981,507 B1 * | 4/2021 | Benjamin | .............. | B60Q 9/008 |
| 2022/0358727 A1 * | 11/2022 | Gupta | ................... | G06T 19/006 |
| 2023/0146434 A1 * | 5/2023 | Kathiresan | .............. | G06F 3/012 |
| | | | | 345/633 |
| 2024/0105075 A1 * | 3/2024 | Kwon | .................... | G06Q 50/04 |
| 2024/0420465 A1 * | 12/2024 | Scarbrough | ............ | G06V 20/20 |

FOREIGN PATENT DOCUMENTS

| | | | |
|---|---|---|---|
| DE | 102019214283 A1 | 3/2021 |
| JP | 2020161988 A | 10/2020 |

* cited by examiner

*Primary Examiner* — Calvin C Ma
(74) *Attorney, Agent, or Firm* — NORTON ROSE FULBRIGHT US LLP

(57) ABSTRACT

A method for ascertaining a configuration of an output of safety-relevant and non-safety-relevant information for a user of an AR device, in particular AR glasses. The method includes: receiving first data, wherein the first data are specific to at least one object in the in particular indirect and/or immediate surroundings of the user; ascertaining a safety relevance of the at least one object to the user on the basis of the first data; generating an output signal to the AR device depending on the ascertained safety relevance such that the AR device outputs safety-relevant information relating to the at least one object with a higher priority than non-safety-relevant information.

17 Claims, 4 Drawing Sheets

100 receive first data
101 ascertain safety
relevance

102 generate output
signal 103 computer
program

AR device

20 inertial sensor
system

25

10,10a

60 communication
interface

306 external sensor
system

27

12 external unit

10b determine safety
relevant
objects

201 generate mask or
filter 202 filter or adapt
information

203 output to AR device
204

10

305 filter or adapt
information

304 user function
14

303

AR device
10a determine safety-
relevant objects exteroceptive sensor
system 25a

301 generate mask or
filter 302 internal sensor
system 25b

301 determine safety-
relevant objects

METHOD FOR ASCERTAINING A CONFIGURATION OF AN OUTPUT OF INFORMATION FOR A USER OF AN AR DEVICE, AND AR DEVICE

CROSS REFERENCE

The present application claims the benefit under 35 U.S.C. § 19 of German Patent Application No. DE 10 2023 202 840.9 filed on Mar. 28, 2023, which is expressly incorporated herein by reference in its entirety.

FIELD

The present invention is based on a method for ascertaining a configuration of an output of safety-relevant and non-safety-relevant information for a user of an AR device.

BACKGROUND INFORMATION

German Patent Application No. DE 10 2019 214 283 A1 describes a method for processing an image captured by a camera, wherein the image is subjected to a predefined transformation in a transformation mode and displayed to a user on a display unit, and the transformation mode is exited upon a predefined event.

SUMMARY

Against this background, the approach presented here provides a method, a device, and a computer program.

According to an example embodiment of the present invention, a method for ascertaining a configuration of an output of safety-relevant and non-safety-relevant information for a user of an AR device, in particular AR glasses, has the following steps. An AR device can be understood here to mean a device that can represent an augmented reality (AR) to the user by outputting additional information to the user, in particular in a computer-aided manner, which information augments the user's perception of reality, for example, visually, auditively or haptically.

According to an example embodiment of the present invention, the method comprises a step of receiving first data, wherein the first data are specific to at least one object in the in particular indirect and/or immediate surroundings of the user. In other words, the first data contain information about the object and information about whether and to what extent the object will or could interact with the user and could represent a potential hazard to the user.

Furthermore, according to an example embodiment of the present invention, the method has a step of ascertaining a safety relevance of the at least one object to the user on the basis of the first data. In other words, the first data are evaluated, for example using a comparison with similar available data or by means of a specifically trained neural network, to determine whether the object represents a hazard to the user and how significant this hazard is.

Furthermore, according to an example embodiment of the present invention, the method has a step of generating an output signal to the AR device, so that, depending on the ascertained safety relevance, the AR device outputs safety-relevant information relating to the at least one object with a higher priority than non-safety-relevant information.

In other words, a prioritization of the information that can be output or is to be output by the AR device to the user is carried out, and the output signal is correspondingly output to the AR device. Depending on the severity of the hazard to the user (e.g. low, medium or high), the AR device can output both non-safety-relevant information and any safety-relevant information relating to the at least one object equally to the user in the case of a low hazard level. In the case of a medium hazard level, the AR device can output non-safety-relevant information to the user for example only to a limited extent or in a less prominent manner than safety-relevant information relating to the at least one object. In the case of a high hazard level, it can be provided for the AR device to stop outputting non-safety-relevant information to the user, or to output it only to a very limited extent, and to continue outputting only the safety-relevant information relating to the at least one object. In this case, this safety-relevant information can also advantageously be output to the user in a prominently highlighted manner.

As a result, it can be ensured that the user is warned of hazardous situations, and the user's attention can additionally be directed to the potential hazard and is not distracted by non-safety-relevant information. It is thus possible for the user to use the AR device even in potentially hazardous situations without having to completely dispense with a functionality of the AR device. The safety of the user of the AR device, for example as a participant in road traffic, but also the safety of other persons in the surroundings of the user can thereby be significantly increased.

Further advantages of the present invention are disclosed herein.

In a preferred embodiment of the present invention, in a further step, second data are received, wherein the second data are specific to the user, and in the step of ascertaining the safety relevance of the at least one object to the user takes place on the basis of the second data. In this way, an in particular instantaneous particular situation of the user within the user's surroundings can be taken into account when ascertaining the safety relevance of the at least one object to the user.

Furthermore, according to an example embodiment of the present invention, it is advantageous if the step of ascertaining the safety relevance comprises a determination of a probability of a collision of the user with the at least one object and/or a probability of a certain degree of severity of the result of an accident for the user and/or for further persons in the surroundings of the user if the user collides with the at least one object. This is because this allows the safety relevance and thus the specific hazard to the user and/or to the further persons in the surroundings of the user to be ascertained in a simple manner, and the AR device to be controlled by means of the corresponding output signal.

Furthermore, according to an example embodiment of the present invention, it can be provided for the output signal to be output when the safety relevance of the at least one object exceeds a determined or determinable value. A certain tolerance range can thereby be defined, in which the AR device is operated without limitation, in particular without the prioritization of the output of safety-relevant information relating to the at least one object and non-safety-relevant information. In addition, this tolerance range can be defined in advance by the user. This is advantageous in particular if multiple different users use the AR device.

In a further preferred embodiment of the present invention, the output of safety-relevant and non-safety-relevant information relates to information to be displayed visually to the user by means of the AR device, and, in the step of generating, the output signal is output to the AR device in such a way that non-safety-relevant information is displayed only in sub-ranges of the visual range of the user that lie outside an object visibility range in which the user can visually detect the object and/or in which no safety-relevant information relating to the at least one object is displayed. In other words, the visual range of the user can thereby be kept free of non-safety-relevant information, so that, in the event of a hazardous situation, the user's attention or concentration is directed to or maintained on the object and is not unnecessarily distracted by non-safety-relevant information.

Furthermore, according to an example embodiment of the present invention, it is advantageous if the safety-relevant information relating to the at least one object is output to the user in a visually, acoustically, and/or haptically emphasized manner. For example, if a medium or high hazard is ascertained, the object can be edged or highlighted in color in the visual range of the user. Alternatively or additionally, the user can be made aware of the object by a warning sound or by a vibration pulse. If the object is concealed from the user and therefore is not or not yet perceptible, it can be provided for the output signal to control the AR device in such a way that it outputs an acoustic warning to the user (e.g., "Attention! hazard from the rear left"). The attention of the user can thereby be directed more specifically to possible hazards, and an accident risk can be reduced further.

In a preferred embodiment of the present invention, a step of transforming takes place before the step of generating the output signal, wherein the at least one safety-relevant object in the surroundings of the user is continuously transformed into a coordinate system of the user and/or the AR device. This ensures that the object and/or the safety-relevant information relating to the at least one object can be carried along and highlighted in the visual range of the user even during a relative movement between the user and the object.

In a further preferred embodiment of the present invention, the first data and/or second data are data that are detected or detectable by an internal sensor system of the AR device. The data can thereby be detected in a particularly simple and energy-saving manner.

According to an example embodiment of the present invention, the internal sensor system can be designed, for example, as an inertial sensor, as an optical sensor, preferably as a camera or as a LIDAR sensor, as a RADAR sensor or as an ultrasonic sensor.

According to an example embodiment of the present invention, Alternatively or additionally, it can be provided for the first data and/or second data to be data that are detected or detectable by an external sensor system connectable or connected to the AR device for signaling purposes. In this case, the first data and/or second data can be obtained by a distributed system of external sensors that, for example, are arranged on stationary roadside units (RSU) or on vehicles in the surroundings of the user or are integrated in electronic devices of further persons in the surroundings of the user, in particular in their smartphones or AR devices. In this way, redundancy can be generated and thus more robust data can be obtained, which leads to a more exact ascertainment of the safety relevance.

The external sensor system can be designed, for example, as an optical sensor, preferably as a camera or as a LIDAR sensor, as a RADAR sensor or as an ultrasonic sensor.

According to an example embodiment of the present invention, it can particularly preferably be provided for the step of ascertaining the safety relevance to the user to be carried out by an external unit that is connected to the AR device for signaling purposes. In this case, a so-called "digital twin" can be generated to represent the user for which the safety relevance is ascertained, which is then transmitted to the AR device.

In a further embodiment of the present invention, the first data specify a type and/or nature of the at least one object, an in particular instantaneous distance between the user and the at least one object, an in particular instantaneous speed of the at least one object, and/or a predicted trajectory of the object in the surroundings of the user. The type of the object can be understood to mean, for example, that it is a thing, such as a motor vehicle, a bicycle, a curb, a street lamp, an open drain or the like, or a living being, such as a further person or an animal. The nature of the object can be understood to mean, for example, a specific size (larger than, smaller than or a similar size to the user), a specific geometry, and/or a specific material (hard or soft). As a result, the probability of a collision of the user with the at least one object and/or the probability of a certain degree of severity of the result of an accident for the user and/or for further persons in the surroundings of the user if the user collides with the at least one object can be determined in a simple and robust manner. For example, for a street lamp that is detected as an object and has a distance of more than 10 m from the user, there is a lower probability of a collision with the user and thus a lower safety relevance than for a cyclist that has a distance of 20 m from the user and is traveling directly toward the user at a speed of 15 km/h. In an analogous manner, the probability of a high degree of severity of the result of an accident will be higher if the user collides with a cyclist traveling directly toward the user at a speed of 15 km/h than if the user collides with the cyclist traveling directly toward the user at a speed of 8 km/h.

Furthermore, according to an example embodiment of the present invention, it can be provided for the second data to specify an instantaneous position, an instantaneous speed and/or a predicted trajectory of the user in the user's surroundings. The safety relevance of the at least one object to the user can thereby be determined even more precisely.

The aforementioned advantages also apply in a corresponding manner to a device, in particular for data processing, which is configured to carry out the method according to one of the embodiments of the present invention described above.

For example, according to an example embodiment of the present invention, the device can have a control unit, wherein the control unit is configured to carry out at least one of the steps of one of the methods according to the preceding embodiments.

In this case, the method can be implemented, for example, in software or hardware or in a mixed form of software and hardware in the device and/or the control unit. For this purpose, the device and/or the control unit can have at least one evaluation unit for processing signals or data, at least one memory unit for storing signals or data, at least one interface to a sensing unit or an actuator for reading sensor signals or characteristic variables from the sensing unit or for outputting control signals to the actuator, and/or at least one communication interface for reading or outputting data embedded in a communication protocol. The evaluation unit can, for example, be a signal processor, a microcontroller or the like, wherein the memory unit can be a flash memory, an EPROM, or a magnetic memory unit. The communication interface can be designed to read or output data wirelessly and/or in a wired form, wherein a communication interface, which can read or output wired data, is able to read these data, for example electrically or optically, from a corresponding data transmission line, or is able to output these data into a corresponding data transmission line.

Preferably, according to an example embodiment of the present invention, the device is designed as an AR device or comprises an AR device. As a result, the safety-relevant and non-safety-relevant information can be output to the user in a simple manner, specifically superimposed on the user's visually, auditively or haptically sensed environment.

Particularly preferably, according to an example embodiment of the present invention, the AR device can be designed as AR glasses or as a head-up display in a vehicle. In this case, the corresponding information can, for example, be visually overlaid in the field of view of the user's field of view.

The present invention also relates to a computer program product or a computer program having program code that can be stored on a machine-readable, in particular non-volatile carrier or storage medium, such as a semiconductor memory, a hard disk memory, or an optical memory, and that is used for carrying out, implementing, and/or controlling the steps of the method according to one of the embodiments described above, in particular when the program product or program is executed on a computer or a device according to one of the embodiments described above.

The present invention also relates to a computer-readable storage medium that comprises the computer program. The storage medium is designed, for example, as a data store such as a hard drive and/or a non-volatile memory and/or a memory card. The storage medium can for example be integrated into the computer or a device according to one of the embodiments described above.

BRIEF DESCRIPTION OF THE DRAWINGS

Exemplary embodiments of the present invention are illustrated schematically in the figures and explained in more detail in the following description. The same reference signs are used for the elements which are shown in the various figures and act similarly, wherein a repeated description of the elements is dispensed with.

DETAILED DESCRIPTION OF EXAMPLE EMBODIMENTS

As already stated above, with the present invention, a method, a device and a computer program are described that allow the attention of a user of an AR device to be directed to a potential hazard without being distracted by non-safety-relevant information.

Figure 1:
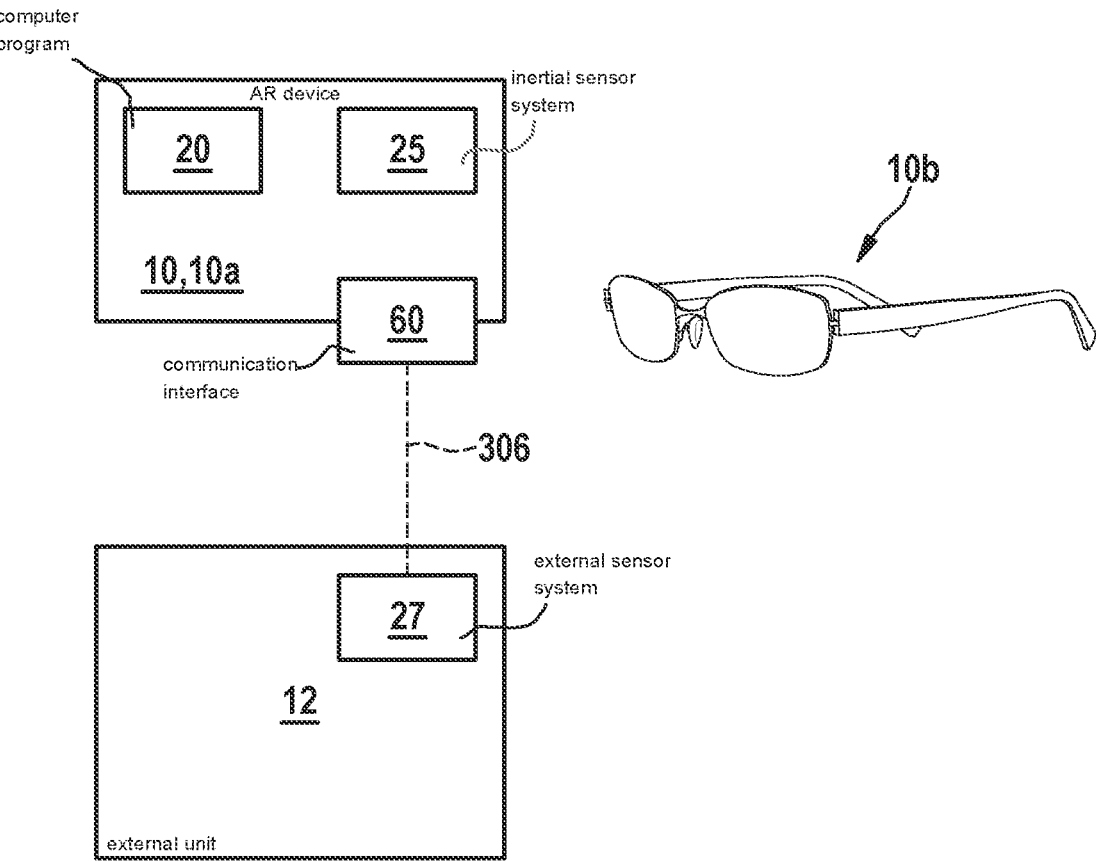
FIG. 1 is a schematic representation of a method, a device and a computer program according to an exemplary embodiment of the present invention.

FIG. 1 illustrates, according to exemplary embodiments of the prese invention, a method 100 for ascertaining a configuration of an output of safety-relevant and non-safety-relevant information for a user of an AR device 10a, wherein the AR device 10a can be designed as AR glasses 10b or as a head-up display in a vehicle.

According to a first method step 101, first data can be received, wherein the first data are specific to at least one object 80, 82 in the in particular indirect and/or immediate surroundings of the user. Optionally, second data can be received, wherein the second data are specific to the user. The first data and/or second data can be detected, for example, by an internal sensor system 25 of the AR device 10, in particular by an inertial sensor, by an optical sensor, preferably a camera or a LIDAR sensor, by a RADAR sensor or by an ultrasonic sensor. It can also be provided for the first data and/or second data to be detected by an external sensor system 27 connectable or connected to the AR device 10a for signaling purposes, in particular by an optical sensor, preferably a camera or a LIDAR sensor, by a RADAR sensor or by an ultrasonic sensor. Subsequently, according to a second method step 102, a safety relevance of the at least one object 80, 82 to the user can be ascertained on the basis of the first data. The step 102 can optionally additionally take place taking into account the second data. In particular, the step 102 can alternatively or additionally be carried out by an external unit 12 that is connected to the AR device 10a for signaling purposes. In this case, a so-called "digital twin" can be generated to represent the user for which the safety relevance is ascertained, which is then transmitted to the AR device 10a. In method step 102, a probability of a collision of the user with the at least one object 80, 82 and/or a probability of a certain degree of severity of the result of an accident for the user and/or for further persons in the surroundings of the user if the user collides with the at least one object 80, 82 can be determined. According to a third method step 103, an output signal to the AR device 10a can then be generated depending on the ascertained safety relevance. This method step 103 is carried out in such a way that the AR device 10a outputs safety-relevant information relating to the at least one object 80, 82 with a higher priority than non-safety-relevant information.

The method steps 101-103 can be performed by a device 10. The device 10 is e.g. a computer and/or a device 10 for data processing and/or a control unit and/or the like and comprises a communication interface 60 for in particular wireless networking (306) with further devices, units, or the like. Furthermore, the device 10 can have a computer program 20 according to exemplary embodiments of the present invention. Furthermore, the device 10 can be designed as the AR device 10a, in particular as the AR glasses 10b or as the head-up display, or can have the AR device 10a, in particular the AR glasses 10b or the head-up display.

Figure 2:
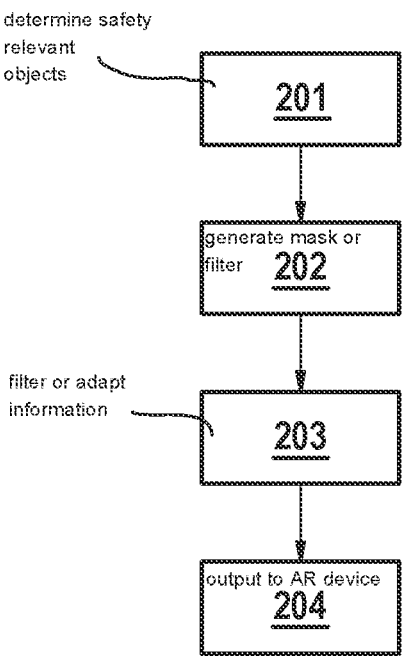
FIG. 2-4 are flow charts for illustrating the method according to further exemplary embodiments of the present invention.

In FIG. 2, a further exemplary sequence is visualized using a flow chart. According to a first step 201, safety-relevant objects 80, 82 can be determined in the surroundings of the user or the AR device 10a. This can be done, for example, by determining the situation and determining the safety criticality. The situation can be determined, for example, by generating a model of the surroundings on the basis of the internal exteroceptive sensor system and optionally additionally on the basis of information from the external sensor system ("digital twin"). These external sensor data can, for example, comprise data relating to infrastructure, vehicles, AR devices (e.g., for objects), models of the surroundings (movement models, weather models, road models (e.g., for behavior prediction, friction values, etc.)), information from other agents (e.g., behavior intention, warnings, maneuver coordination message, etc.).

The determination of the safety criticality of the objects 80, 82 or elements themselves or the risk associated therewith can be dependent on the probability of them constituting a danger to the user in the future, for example by a collision, and on the severity of this event (for the user but also for others). For this purpose, detailed models can advantageously be used both for predicting future states (of the user and the environment) and for evaluating the severity of events. Corresponding models and functions are currently developed for use in autonomous vehicle systems and can also be used for use in AR glasses. Furthermore, for example, an ML module trained and validated with a sufficient amount of data, for example a deep neural network (DNN), can be used for the evaluation of the situation. In both approaches, it is important also to predict the behavior and the future state of the user. For this purpose, it is determined, among other things, how the user is currently moving, e.g., on foot, on a bicycle, in a vehicle. In addition, a more detailed movement model of the user (straight, zigzag, fast/slow) can also be used.

For determining the safety criticality, however, simpler calculation methods only on the basis of distances, relative speeds, and detected lane courses of both the user and the object 80, 82 (e.g. on the basis of time-to-collision, RSS) are also possible. For example, the safety criticality of far away regions is in principle not as high as for regions directly in front of the user, since more time is available to the user to react to hazards from this region.

The determination of the safety criticality can alternatively or additionally take place in an external device or computing unit ("digital twin"). In this case, the safety-relevant objects 80, 82, elements, events or regions are then provided to the AR device 10a by the digital twin. In this case, the transmission takes place via wireless communication either only on request by the AR device 10a or continuously by broadcast/pub-sub.

According to a second step 202, a mask or a filter can be generated for the information to be output to the user via the AR device 10a. In this case, a "mask" for the safety-relevant objects 80, 82, elements or regions in the surroundings is then generated, on the basis of the information determined in the previous step (internally or by the digital twin), in the AR device 10a relative to the AR device 10a and the sensory system of the user (in particular eyes, but also ears). That is to say, the safety-relevant objects 80, 82 or regions to be masked lie in the coordinate system of the world, the mask transforms this onto the coordinate system of the AR device 10a, and carries this transformation along continuously with the movement of the AR device 10a.

Alternatively, the mask can already be generated or calculated in the digital twin. For this purpose, the precise positioning of the AR device 10a is determined either from the outside by the digital twin or by information relating to the pose transmitted directly from the AR device 10a to the digital twin.

According to a third step 203, the information to be output to the user can be filtered or adapted. For this purpose, the mask can be used to filter display data generated by the AR device 10a on the basis of functions selected by the user (e.g., representation of Pokémon characters, AR arrows for navigation, TikTok videos, etc.) such that they do not conceal safety-relevant regions in the surroundings of the user (relative to the user or sensory system (eyes, ears)). Optionally, the information about the filtered regions can be passed back to a user function 14, so that the user function 14 can adapt its representation in such a way that the safety-relevant regions are not used for the display.

According to a fourth step 204, the filtered information can be output to the AR device 10a, so that only the filtered AR data or AR information is displayed to the user. The user thus has a free view of the safety-relevant objects 80, 82, elements, events or regions in the user's surroundings.

Figure 3:
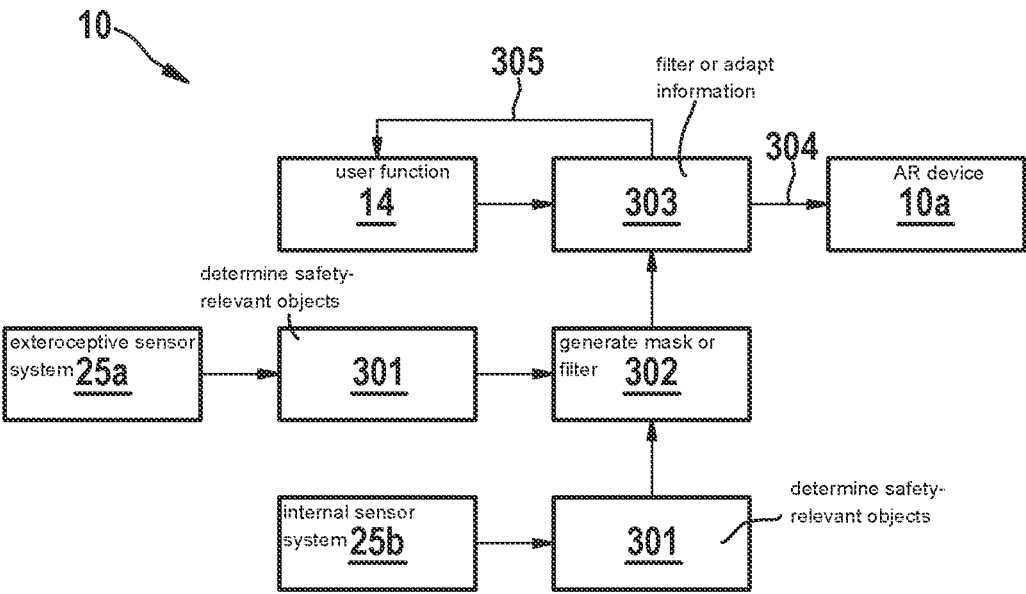

FIG. 3 shows a further exemplary sequence of the method within the device 10 using a block diagram. According to a first step 301, safety-relevant objects 80, 82 can be determined in the surroundings of the user or the AR device 10a. For this purpose, first data are detected by an internal, exteroceptive sensor system 25a. Furthermore, in the first step 301, a position and/or orientation of the AR device 10a relative to the surroundings of the user or relative to the sensory system of the user (in particular eyes, but also ears) can be determined by detecting second data by means of an internal sensor system 25b, wherein the internal sensor system 25b is preferably designed as an inertial sensor system. According to a second step 302, a mask or a filter can be generated for the information to be output to the user via the AR device 10a. In this case, a "mask" for the safety-relevant objects 80, 82, elements or regions in the surroundings is then generated, on the basis of the information determined in the previous step, in the AR device 10a relative to the AR device 10a and the sensory system of the user (in particular eyes, but also ears). According to a third step 303, the information to be output to the user can be filtered or adapted in such a way that safety-relevant information is not superimposed or even covered with non-safety-relevant information. For this purpose, the mask can be used to filter display data generated by the AR device 10a on the basis of functions selected by the user (e.g., representation of Pokémon characters, AR arrows for navigation, TikTok videos, etc.) such that they do not conceal safety-relevant regions in the surroundings of the user (relative to the user or sensory system (eyes, ears)). According to a fourth step 304, the filtered information can be output to the AR device 10a, so that only the filtered AR data or AR information is displayed to the user. Optionally, the information about the filtered regions can be passed back to the user function 14 (indicated by arrow 305), so that the user function 14 can adapt its representation in such a way that the safety-relevant regions are not used for the display.

Figure 4:
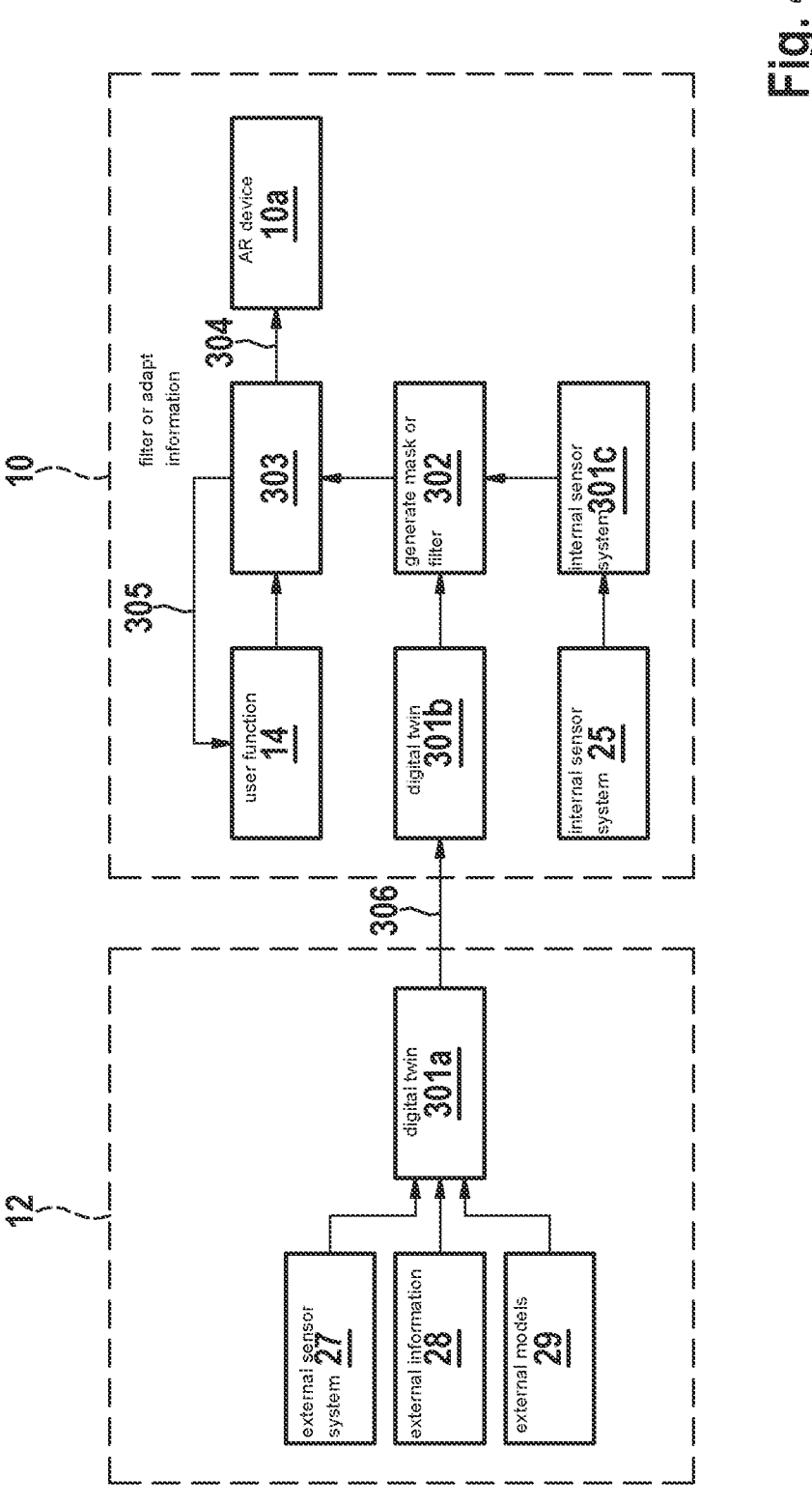

FIG. 4 shows a further exemplary sequence of the method within the device 10 using a block diagram. This is an alternative to the embodiment described in FIG. 3, in which the situation (301) is determined by generating the model of the surroundings on the basis of data that are detected using an external sensor system 27, external information 28 and/or external models 29, in an external unit 12, the "digital twin" (301a). Furthermore, the safety criticality is also determined in the "digital twin". In this case, the safety-relevant objects 80, 82, elements, events or regions are then provided to the device 10 or the AR device 10a by the digital twin (301b) by means of a wireless connection (306). Furthermore, a position and/or orientation of the AR device 10a relative to the surroundings of the user or relative to the sensory system of the user (in particular eyes, but also ears) can be determined by detecting second data by means of an internal sensor system 25b (301c), wherein the internal sensor system 25b is preferably designed as an inertial sensor system.

Figure 5:
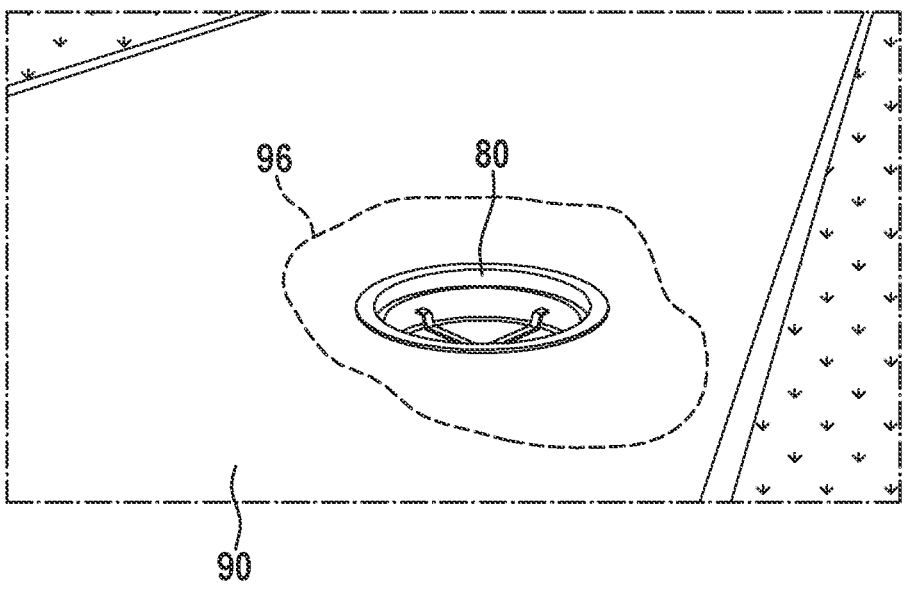
FIG. 5 is a schematic representation for the visualization of the present invention according to an exemplary embodiment of the present invention.
Figure 6:
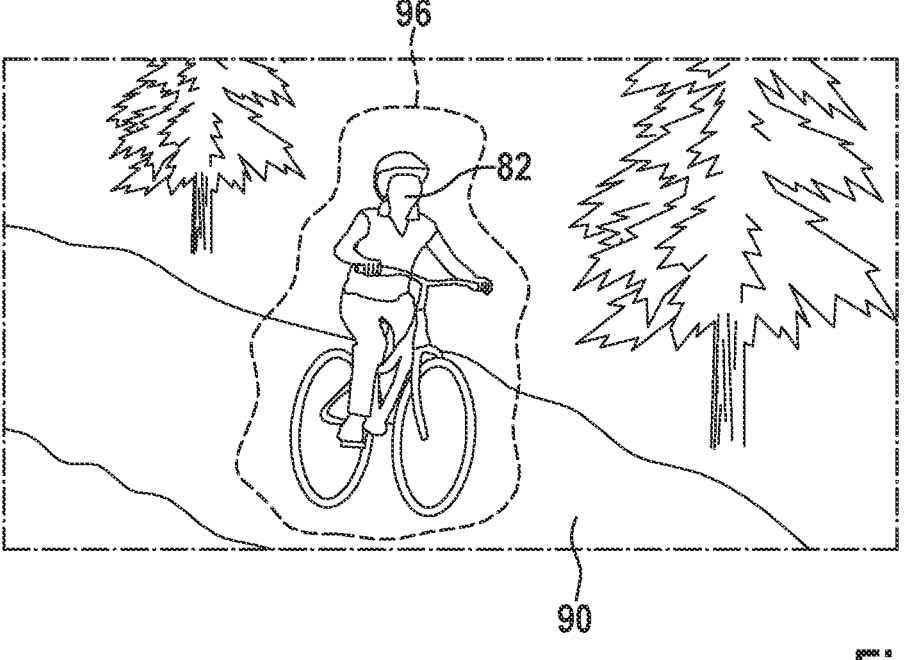
FIG. 6 is a schematic representation for the visualization of the present invention according to a further exemplary embodiment.

FIGS. 5 and 6 show schematic representations for the visualization of the present invention according to two exemplary embodiments. FIG. 5 shows a detail of a visual range 90 of the user of the AR device 10a, which detail shows a section of a road 85 with a drain 80a without a drain cover as the object 80 that is safety-relevant to the user. The device 10 or the AR device 10a recognizes that the drain 80a represents a hazard to the user and generates a mask 96 around the drain 80a in such a way that, in the AR representation shown to the user, the region around the drain 80a is kept free of non-safety-relevant information and/or is visually emphasized. In the rest of the region of the visual range 90 of the user, the AR device 10a can continue to display non-safety-relevant information to the user.

FIG. 6 shows a detail of a visual range 90 of the user of the AR device 10a, which detail shows a forest path with a cyclist 82a as the object 82 that is safety-relevant to the user. The device 10 or the AR device 10a recognizes that the cyclist 82a represents a hazard to the user and generates a mask 96 around the cyclist 82a in such a way that, in the AR representation shown to the user, the region around the cyclist 82a is kept free of non-safety-relevant information and/or is visually emphasized. In the rest of the region of the visual range 90 of the user, the AR device 10a can continue to display non-safety-relevant information to the user.

What is claimed is:

1. A method for ascertaining a configuration of an output of safety-relevant and non-safety-relevant information for a user of an AR device, the method comprising the following steps:

receiving first data, wherein the first data are specific to at least one object in an indirect and/or immediate surroundings of the user;

ascertaining a safety relevance of the at least one object to the user based on the first data, the first data being specific to the at least one object by corresponding to a probability of danger to the user that is particular to the at least one object and is inapplicable to another object in the surroundings of the user; and generating an output signal to the AR device depending on the ascertained safety relevance such that the AR device outputs safety-relevant information relating to the at least one object with a higher priority than non-safety-relevant information.

2. The method according to claim 1, wherein the AR device is AR glasses.

3. The method according to claim 1, wherein, in a further step, second data are received, wherein the second data are specific to the user, and in the step of ascertaining, the safety relevance of the at least one object to the user takes place based on the second data.

4. The method according to claim 3, wherein the first data and/or second data are data that are detected or detectable by an internal sensor system of the AR device using: (i) an inertial sensor and/or (ii) an optical sensor and/or (iii) or a camera and/or (iv) a LIDAR sensor and/or (v) a RADAR sensor and/or (vi) an ultrasonic sensor and/or (vii) an external sensor system connectable or connected to the AR device for signaling purposes using an optical sensor or a camera or a AR sensor or a RADAR sensor or n ultrasonic sensor.

5. The method according to claim 3, wherein the second data specify an instantaneous position and/or an instantaneous speed, and/or a predicted trajectory of the user in the user's surroundings.

6. The method according to claim 1, wherein the step of ascertaining the safety relevance includes a determination of: (i) a probability of a collision of the user with the at least one object, and/or (ii) a probability of a certain degree of severity of a result of an accident for the user and/or for further persons in surroundings of the user if the user collides with the at least one object.

7. The method according to claim 1, wherein the output signal is output when the safety relevance of the at least one object exceeds a determined or determinable value.

8. The method according to claim 1, wherein the output of safety-relevant and non-safety-relevant information relates to information to be displayed visually to the user using the AR device in a visual range of the user, and, in the step of generating, the output signal is output to the AR device in such a way that non-safety-relevant information is displayed only in sub-ranges of the visual range of the user that lie outside an object visibility range in which the user can visually detect the object and/or in which no safety-relevant information relating to the at least one object is displayed.

9. The method according to claim 1, wherein the safety-relevant information relating to the at least one object is output to the user in a visually and/or acoustically and/or haptically emphasized manner.

10. The method according to claim 1, wherein a step of transforming takes place before the step of generating the output signal, and wherein in the transforming steps, the at least one safety-relevant object in the surroundings of the user is continuously transformed into a coordinate system of the user and/or the AR device.

11. The method according to claim 1, wherein that the first data specify a type of the at least one object and/or nature of the at least one object and/or an in particular instantaneous distance between the user and the at least one object and/or an instantaneous speed of the at least one object and/or a predicted trajectory of the at least one object in the surroundings of the user.

12. The method according to claim 1, wherein the generating includes applying a mask or filter such that in a field of view output by the AR device to the user a visual representation of the non-safety-relevant information does not cover a visual representation of the safety-relevant information.

13. A device for data processing, the device configured to ascertain a configuration of an output of safety-relevant and non-safety-relevant information for a user of an AR device, the device configured to:

receive first data, wherein the first data are specific to at least one object in an indirect and/or immediate surroundings of the user;

ascertain a safety relevance of the at least one object to the user based on the first data, the first data being specific to the at least one object by corresponding to a probability of danger to the user that is particular to the at least one object and is inapplicable to another object in the surroundings of the user; and generate an output signal to the AR device depending on the ascertained safety relevance such that the AR device outputs safety-relevant information relating to the at least one object with a higher priority than non-safety-relevant information.

14. The device according to claim 13, wherein: (i) the device is an AR device or AR glasses or a head-up display, or (ii) the device has an AR device or AR glasses or a head-up display.

15. The device according to claim 13, wherein in order to generate the output signal a mask or filter is applied such that in a field of view output by the AR device to the user a visual representation of the non-safety-relevant information does not cover a visual representation of the safety-relevant information.

16. A non-transitory computer-readable medium on which is stored a computer program including instructions for ascertaining a configuration of an output of safety-relevant and non-safety-relevant information for a user of an AR device, the instructions, when executed by a computer, causing the computer to perform the following steps:

receiving first data, wherein the first data are specific to at least one object in an indirect and/or immediate surroundings of the user;

ascertaining a safety relevance of the at least one object to the user based on the first data, the first data being specific to the at least one object by corresponding to a probability of danger to the user that is particular to the at least one object and is inapplicable to another object in the surroundings of the user; and generating an output signal to the AR device depending on the ascertained safety relevance such that the AR device outputs safety-relevant information relating to the at least one object with a higher priority than non-safety-relevant information.

17. The non-transitory computer-readable medium according to claim 16, wherein the generating includes applying a mask or filter such that in a field of view output by the AR device to the user a visual representation of the non-safety-relevant information does not cover a visual representation of the safety-relevant information.

* * * * *